United States Patent
Shapira et al.

(10) Patent No.: US 12,314,384 B1
(45) Date of Patent: May 27, 2025

(54) SYSTEMS AND METHODS FOR DETECTING NON-PROVISIONED USAGE OF APPLICATIONS IN AN ORGANIZATION

(71) Applicant: Recolabs Ltd, Tel Aviv (IL)

(72) Inventors: Tal Shapira, Tel-Aviv (IL); Eyal Asulin, Tel Aviv-Jaffa (IL); Or Elias, Tel Aviv (IL); Dana Hohenstein, Givatayim (IL); Liron Ben Haim, Rehovot (IL)

(73) Assignee: Recolabs Ltd, Tel Aviv (IL)

( * ) Notice: Subject to any disclaimer, the term of this patent is extended or adjusted under 35 U.S.C. 154(b) by 0 days.

(21) Appl. No.: 18/938,365

(22) Filed: Nov. 6, 2024

(51) Int. Cl.
G06F 21/55 (2013.01)
G06F 21/00 (2013.01)

(52) U.S. Cl.
CPC ...... *G06F 21/55* (2013.01); *G06F 2221/2141* (2013.01)

(58) Field of Classification Search
CPC .......... G06F 21/55; G06F 21/50; G06F 21/51; G06F 21/52; G06F 21/554; G06F 21/62; G06F 21/629
See application file for complete search history.

(56) References Cited

U.S. PATENT DOCUMENTS

2012/0102489 A1* 4/2012 Staiman ............. G06Q 10/0631
718/1

* cited by examiner

*Primary Examiner* — Edward Zee
(74) *Attorney, Agent, or Firm* — PEARL COHEN ZEDEK LATZER BARATZ LLP

(57) ABSTRACT

A method for identifying non-provisioned access to software applications, the method comprising collecting from resources used by an organization a data record of software applications used by entities of the organization and a list of accounts registered in the software applications, performing an entity consolidation process to identify a main AD account associated with a specific account, where the main AD account is the account used for provisioned access to the software applications, extracting a list of application definitions that the main AD account of the specific account is assigned to access in a provisioned manner, performing an application consolidation process to identify a generic application identifier associated with a specific application of the software applications, and determining whether the specific account accesses the specific application in a provisioned manner or a non-provisioned manner according to the application definitions of the main AD account associated with the specific account.

8 Claims, 4 Drawing Sheets

SYSTEMS AND METHODS FOR DETECTING NON-PROVISIONED USAGE OF APPLICATIONS IN AN ORGANIZATION

FIELD

The invention, in some embodiments thereof, relates to usage of applications operating in organizations and, more specifically, but not exclusively, to systems and methods for identifying non-provisioned usage of applications in organizations.

Enterprises use internet-based services, such as Office365, Box, Salesforce, Slack and others, to improve the organization's productivity, collaboration and business application workloads. Employees may access the applications in a provisioned manner, using a main identity identifier (for example phone number or email address), or in a non-provisioned manner. Using the applications in a provisioned manner may be achieved by accessing Identity Providers (IDPs) used by the organization's employees. Identity Providers are centralized services that manage user identities and authentication for accessing various applications and resources within an organization's IT infrastructure or across different systems, such as Okta, Google Workspace, and the like.

Organizations wish all the employees to use the applications/services in a provisioned manner for regulatory matters and in order to improve security and monitoring. However, organizations face difficulties in monitoring all the entities' activity to check that all the usage of the applications in the organization is done in a provisioned manner, via the IDPs.

SUMMARY

The invention, in embodiments thereof, provides a method for identifying non-provisioned access to software applications, the method comprises: collecting from resources used by an organization a data record of software applications used by identities of the organization and a list of accounts registered in the software applications; performing an entity consolidation process to identify a main active directory (AD) account associated with a specific account; wherein the main AD account is the account used for provisioned access to the software applications; extracting a list of application definitions that the main AD account of the specific account is assigned to access in a provisioned manner; performing an application consolidation process to identify a generic application identifier associated with a specific application of the software applications; determining whether the specific account accesses the specific application in a provisioned manner or a non-provisioned manner according to the application definitions of the main AD account associated with the specific account.

In some cases, the method further comprises preventing access to the specific account in case the specific account is deleted from the organizational database or was not active in a predetermined time duration.

In some cases, the entity consolidation process comprises comparing metadata related to the specific account with the metadata related to existing entities in the organizational database. In some cases, application definitions define the tool or technique assigned to the main AD account. In some cases, the application consolidation process comprises identifying whether an instance of the specific application is related to a known application or a new application.

In some cases, an output of the application consolidation process is an application definition associated with each generic app ID, wherein the application definition comprises at least a URL required to access the application in a provisioned manner. In some cases, the method further comprises preventing access to the specific account in case the specific account is deleted from the organizational database. In some cases, the method further comprises preventing access to the specific account in case the specific account was not active in a predetermined time duration before the authorization process.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

At least some implementations described herein address the technical problem of discovering non-provisioned usage of applications being used by entities of an organization. The entities may be persons, services, virtual machines, devices and the like. Current IT and security solutions obtain the interactions between the entities and the applications and cannot identify whether the usage is provisioned or non-provisioned. Provisioned usage is also named summoned usage, federated usage and indirect usage.

The technical solution is a computing system and method configured to collect usage events in which organization entities access or request access to applications. The method is configured to determine whether or not entities are permitted to access applications. The method comprises performing an entity consolidation in which multiple accounts are defined as belonging to a single entity, for example, according to an entity identifier such as a main email address or a phone number. The method also comprises identifying a Main Active Directory (MAD) identifier of the entities and performing an application consolidation process in which multiple applications of the same URL address are defined as a single application. Then, the method uses a list of permissions stored in the organizational database to identify which applications are permitted to the entities with the MAD identifier, and determine whether the entity related to the MAD identifier accesses the specific application in a provisioned manner or a non-provisioned manner.

Figure 1:
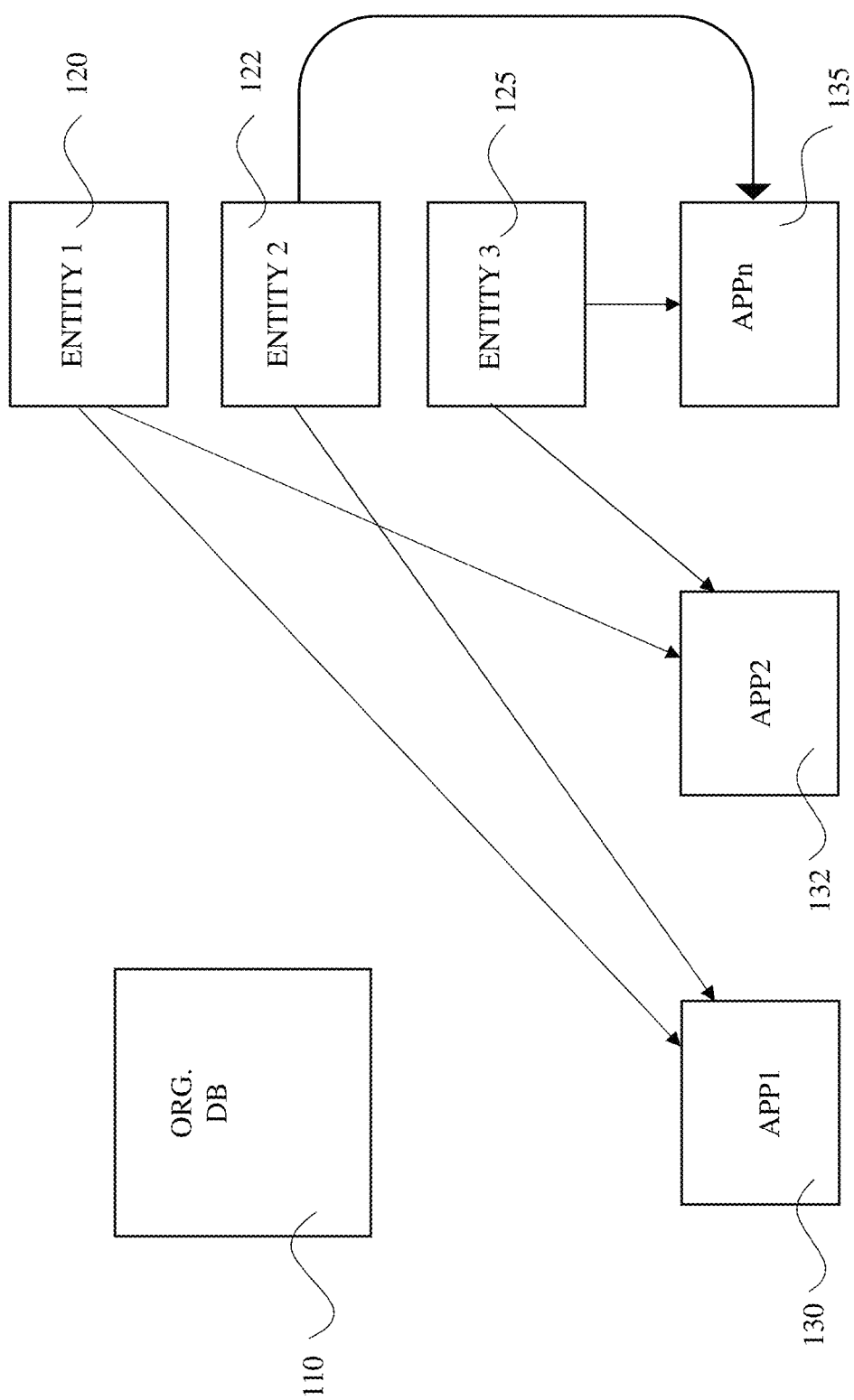
FIG. 1 shows user devices, applications, and a server configured to identify non-provisioned usage of applications in an organization, in accordance with some embodiments of the invention.

FIG. 1 shows user entities, applications, and a server configured to identify non-provisioned usage of applications in an organization, in accordance with some embodiments of the invention. The entities 120, 122, 125 create accounts to access computerized applications 130, 132, 135, for example using electronic devices such as laptop computers, cellular phones, tablet computers, personal computers and the like. The entities 120, 122, 125 may request access to the computerized applications 130, 132, 135 via one or more IDPs (Google Workspace, Microsoft, Okta, and the like). In some cases, multiple users operate in a single user device and input identifiers such as an email address and a password. This way, multiple users or other types of entities may access a specific application from the same device.

Server 110 is configured to collect usage information on the applications 130, 132, 135 and identify whether or not entities 120, 122 and 125 access the applications in a non-provisioned manner, without using the IDPs. In some cases, identifying non-provisioned usage may be performed when a specific application receives a request to access the application. in some other cases, the process of identifying non-provisioned usage is done periodically, for example once a week. Identifying non-provisioned usage is also named as using a local account, as opposed to a provisioned account.

Figure 2:
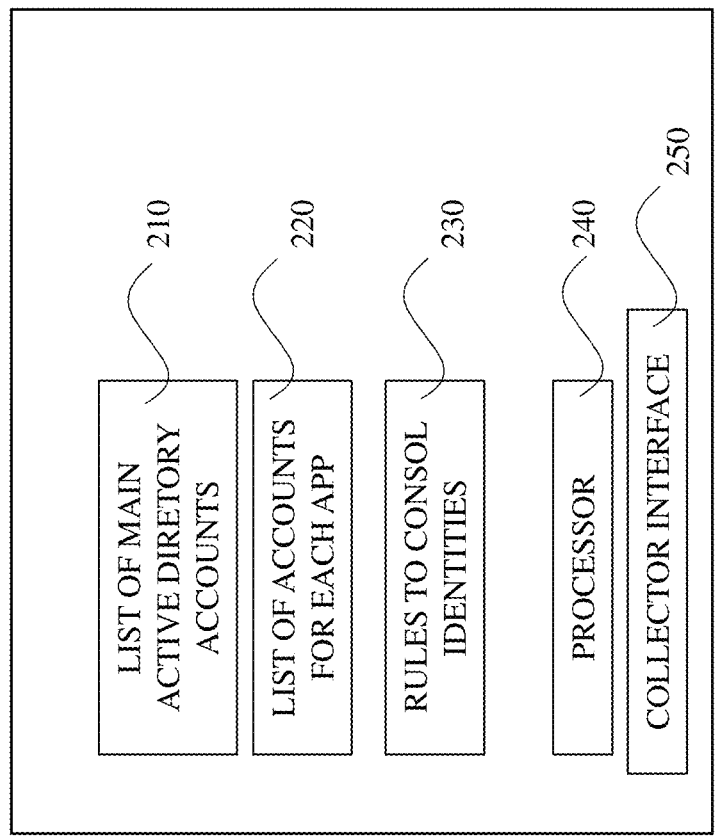
FIG. 2 shows a computing system configured to identify non-provisioned usage of applications in an organization, in accordance with some embodiments of the invention.

FIG. 2 shows a computing system configured to identify non-provisioned usage of applications in an organization, in accordance with some embodiments of the invention. In various embodiments, the computing system described herein performs a specific process to identify non-provisioned usage of applications in an organization described in greater detail herein. In certain embodiments, identifying non-provisioned usage enables applying security policies on relevant entities or users, hence improving the organization's data security. Once the computing system is configured to perform the process of identifying non-provisioned usage, the computing system may identify abnormal usage of a specific application used by a specific entity, compared to the usage of other applications by the specific entity.

The computing system comprises a processor 240 configured to manage the processes performed by the computing system. The processor 240 may be any one or more processors such as a Central Processing Unit (CPU), a microprocessor, an electronic circuit, an Integrated Circuit (IC), or the like. The processor 240 may be utilized to perform computations required by the computing system or any of its subcomponents.

The computing system may also comprise a collector interface 250 configured to collect information from resources used by entities of the organization. The entities may include one or more IDPs (Google Workspace, Microsoft, Okta, and the like), incoming email messages, APIs operated and/or managed by the software applications, operation logs of the organization, and the like. The information received via the collector interface 250 comprises instances of using the applications by the organizational entities.

The computing system comprises a memory configured to store rules and organizational information. The memory may be a hard disk drive, a Flash disk, a Random Access Memory (RAM), a memory chip, or the like. In some exemplary embodiments, memory can retain program code operative to cause processor 240 to perform acts associated with any of the subcomponents of the computing system.

The memory comprises a list of main active directory (MADs) accounts 210. The list of MAD accounts comprises multiple identity identifiers defined as related to the main identity identifier of a specific entity. For example, each employee of the organization is related to a main email address used to access organizational applications in a provisioned manner. In addition to the main email address, the employees have additional usernames, email addresses, and texts/strings used to access the applications.

The memory comprises a list of accounts for each application 220. The applications are operated by entities that create accounts, for example via email addresses. The accounts are associated with a MAD using the entity consolidation process.

Figure 3:
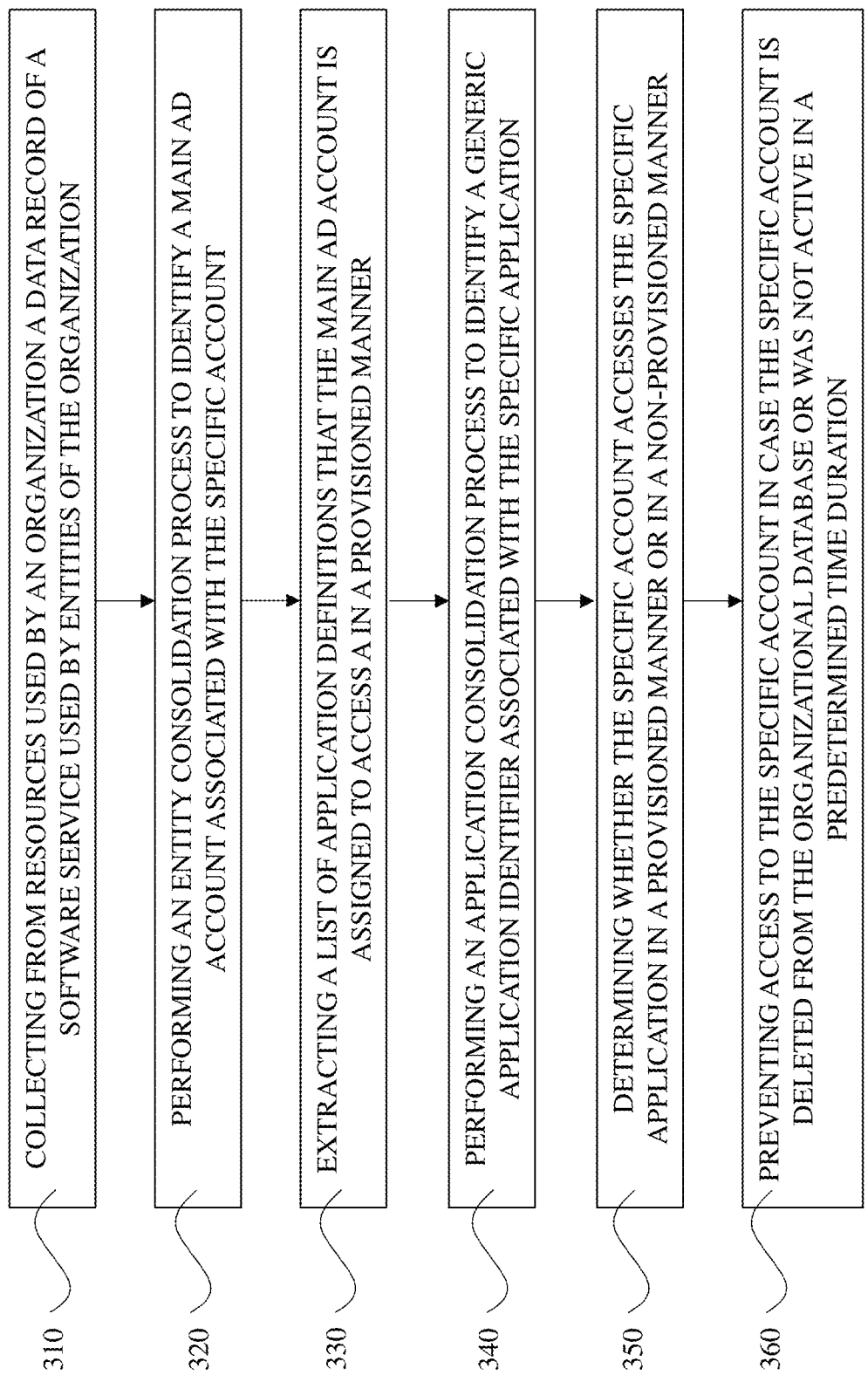
FIG. 3 shows a method for identifying non-provisioned usage of applications in an organization, in accordance with some embodiments of the invention.

The memory comprises rules required to perform entity consolidation processes 230. The entity consolidation process is a process in which multiple entity identifiers are identified as belonging to a single entity. For example, the same person or the same service use multiple email addresses to access FIG. 3 shows a flowchart of a method of determining whether or not entities in an organization access applications in a provisioned manner, in accordance with some embodiments of the invention.

Step 310 discloses collecting from resources used by an organization a data record of an application used by entities of the organization. The resources may be incoming email messages, Identity Providers (IDPs), APIs to services, activity logs from operation systems of devices used by the entities in the organization, activity logs & API calls from internet services (apps), and the like. Identity Providers are centralized services that manage user identities and authentication for accessing various applications and resources within an organization's IT infrastructure or across different systems, such as Okta, Google Workspace, Microsoft active directory (Entra-ID) and the like.

The entities may be persons, virtual entities, bots, services, and the like. The collection may be implemented by receiving a file from the resource, loading data into a file, API messages, sending a message to an account or device operated by the organization, updating a memory address of a device or virtual machine operated by the organization, and the like.

Step 320 discloses performing an entity consolidation process to identify a main AD account associated with the specific account. The entity consolidation process comprises comparing metadata related to the specific account with the metadata related to existing entities in the organizational database. The metadata may include email addresses, prefixes, names, activities of the specific account in the applications operated by the organization, and the like. The main AD account is the account used for provisioned access to software applications.

Step 330 discloses extracting a list of application definitions that the main AD account is assigned to access in a provisioned manner. The application definitions may be SSO or SAML or openID. The application definitions define the tool or technique assigned to the main AD account. The definitions are used by the organizational application, for example the URL may be (organization_name.app_name.com) used by the active directory to authenticate provisioned users.

Step 340 discloses performing an application consolidation process to identify a generic application identifier associated with the specific application. The application consolidation process comprises identifying whether an instance of the specific application is related to a known application or a new application. The application consolidation process may be performed using a language model configured to identify a generic app ID from the collected events in the organizational database in which accounts access applications and check whether the generic app ID already exists in a service database that stores names and metadata of software applications used in the organization. The output of the application consolidation process is an application definition associated with each generic app ID. The application definition comprises at least the URL required to access the application in a provisioned manner.

Step 350 discloses determining whether the specific account accesses the specific application in a provisioned manner or in a non-provisioned manner. The specific account is uniquely related to the main AD account. Similarly, the specific application is assigned specific application definitions. However, the main AD accounts in the organizational database have permissions related to a limited number of applications. The limited number of applications in the organizational DB have a generic app ID, such that multiple applications are defined in the organizational DB as related to the generic app ID. The specific account can access the specific application in case the entity related to the specific account can access the generic app ID of the specific application.

Step 360 discloses preventing access to the specific account in case the specific account is deleted from the organizational database or was not active in a predetermined time duration prior to the authorization process disclosed herein.

Figure 4:
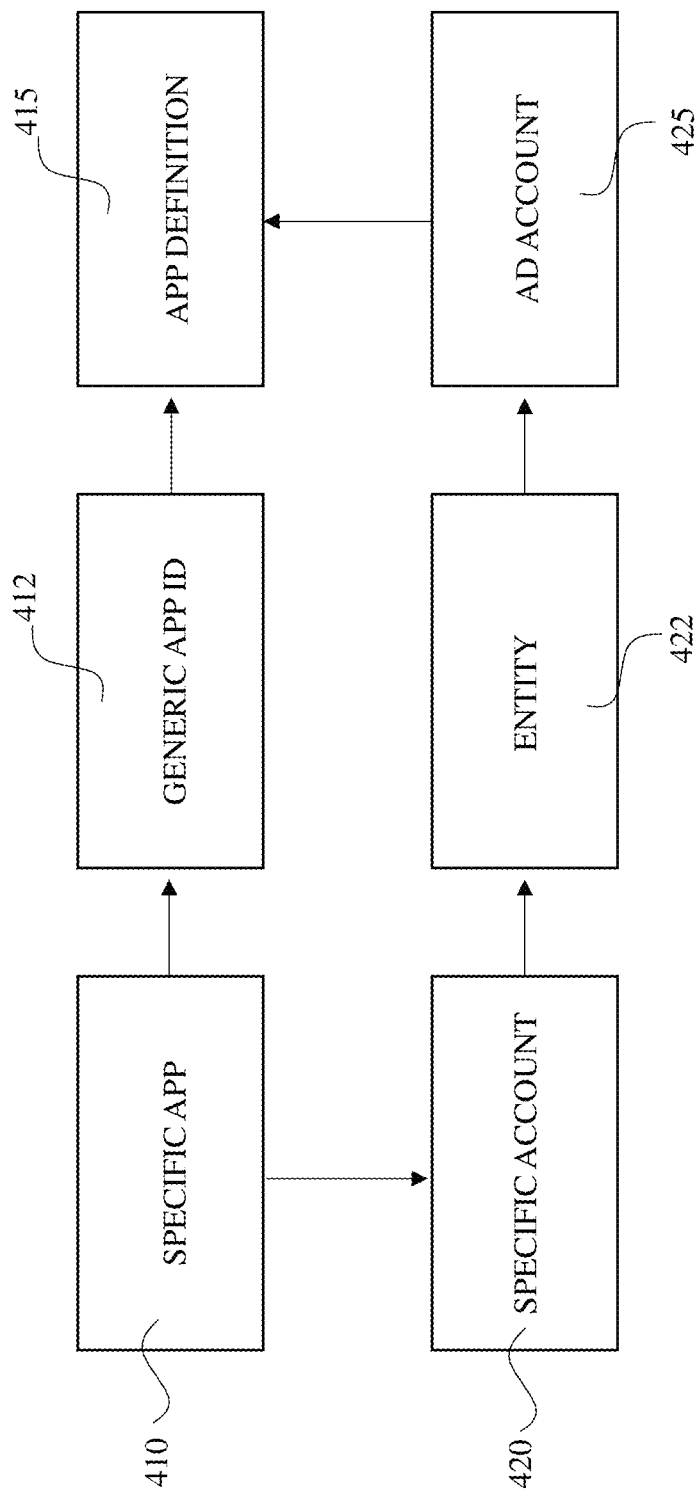
FIG. 4 shows schematic data fields of an organizational database and the relationships between them, according to exemplary embodiments of the invention.

FIG. 4 shows schematic data fields of an organizational database and the relationships between them, according to exemplary embodiments of the invention. The organizational database stores records of specific accounts 420 and specific applications 410 used by various accounts in the list of specific accounts 420. When performing an entity consolidation process, the accounts in the list of specific accounts 420 are related to an entity 422. The entity is related to a main active directory (AD) account which is the account used for provisioned access to software applications.

The specific application in the list of applications 410 is associated with a generic app ID 412 after the application consolidation process. The generic app ID is associated with application definitions, such as a URL used for provisioned access to the application. when the AD account 425 of the specific account is permitted to access the specific application according to the application definitions 415, the specific account is determined as accessing the specific application in a provisioned manner.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations.

What is claimed is:

1. A method for identifying non-provisioned access to software applications, the method comprising:
    collecting from resources used by an organization a data record of software applications used by entities of the organization and a list of accounts registered in the software applications;

performing an entity consolidation process to identify a main active directory (AD) account associated with a specific account; wherein the main AD account is the account used for provisioned access to the software applications;

extracting a list of application definitions that the main AD account of the specific account is assigned to access in a provisioned manner;

performing an application consolidation process to identify a generic application identifier associated with a specific application of the software applications; and determining whether the specific account accesses the specific application in a provisioned manner or a non-provisioned manner according to the application definitions of the main AD account associated with the specific account.

2. The method of claim 1, further comprising preventing access to the specific account in case the specific account is deleted from an organizational database or was not active in a predetermined time duration.

3. The method of claim 1, wherein the entity consolidation process comprises comparing metadata related to the specific account with the metadata related to existing entities in an organizational database.

4. The method of claim 1, wherein the application definitions define a tool or technique assigned to the main AD account.

5. The method of claim 1, wherein the application consolidation process comprises identifying whether an instance of the specific application is related to a known application or a new application.

6. The method of claim 1, wherein an output of the application consolidation process is an application definition associated with each generic app ID, wherein the application definition comprises at least a URL required to access the corresponding application in a provisioned manner.

7. The method of claim 1, further comprising preventing access to the specific account in case the specific account is deleted from an organizational database.

8. The method of claim 1, further comprising preventing access to the specific account in case the specific account was not active in a predetermined time duration before an authorization process.

\* \* \* \* \*